INVENTOR.
ANDRE A. JAECKLIN
BY
Robert G. Clay
ATTORNEY

INVENTOR.
ANDRE A. JAECKLIN
BY Robert G. Clay
ATTORNEY

United States Patent Office 3,521,246
Patented July 21, 1970

3,521,246

FAST MAGNETIC FILM LOGIC AND STORAGE SYSTEM UTILIZING A ROTATIONAL MODE OF MAGNETIC REVERSAL

Andre A. Jaecklin, Palo Alto, Calif., assignor to Ampex Corporation, Redwood City, Calif., a corporation of California Filed Apr. 5, 1967, Ser. No. 628,768
Int. Cl. G11c *11/14, 19/00*
U.S. Cl. 340—174 12 Claims

ABSTRACT OF THE DISCLOSURE

System of fast logic and storage utilizing thin magnetic films and propagating a magnetic reversal by a rotational mode. Reversal is generally provided by homogeneously applying a small easy axis field opposite in polarity to the magnetization of the thin film and thereafter locally applying a hard axis field to the film whereupon the rotated portion of the magnetic film tends to expand laterally due to magnetostatic interaction. The reversal can be detected during the time of propagation to provide readout.

BACKGROUND OF THE INVENTION

Very few devices exist which combine propagation of information and storage without using an excessive amount of components. Typical among such devices are those magnetic devices utilizing the propagation of domain walls in thin magnetic films which phenomenon is relatively slow, or semi-conductor devices which may be faster and also capable of storage, but which are generally complex and have volatile information, i.e., the information is lost if the power supplied to the device is removed. A typical prior art thin film system utilizing a magnetic domain wall storage and logic system is described in U.S. Pat. 3,176,276 to D. O. Smith.

Concerning prior art in general, three basic modes of switching are observed in thin permalloy films; domain wall motion, coherent rotation, and non-coherent rotation. Non-coherent rotation is least understood and has received most attention in the current literature. R. V. Telesnin et al., present general features of non-coherent rotation in their article "Experimental Investigation of Some Features of Incoherent Rotation in Thin Permalloy Films" Physica Status Solidi, 14, pp. 371–80, 1966. J. H. Hoper in his article "A Study of Noncoherent Rotation Switching for Thin Magnetic Films" IEEE Transactions Magnetics, Mag–2, p. 580, 1966, suggests that the anomalous behavior of non-coherent rotation may be explained by the modified strip domain model of H. Thomas. The article by H. Thomas is "A Theoretical Model for Partial Rotation" Journal of Applied Physics, 33, pp. 1117–8, 1962. Evidence was brought forth by K. U. Stein in his article "Kohaerente and Inkohaerente Drehung bei Impulsummagnetisierung duenner Nickeleisenschichten" Z.f. angew. Physik, 20, pp. 36–46, 1965, that a film which switches in the non-coherent mode forms strip-like regions and that these strips form according to the local magnetization distribution (magnetization ripple) before switching. Stein concludes that the boundaries of each strip can be considered as "dynamic walls," i.e., partially reversed regions much wider than domain walls which appear to propagate at very high speed. In all the references cited above, switching is induced by means of a homogeneously-applied field.

SUMMARY OF THE INVENTION

The present invention provides logic and storage elements wherein a magnetic reversal is propagated by rotational mode which is relatively much faster than conventional domain wall switching. The present invention accordingly features the application of selected fields to a magnetic thin film to cause propagation of a magnetic reversal across a selected region of the film.

Considering a first embodiment of the invention, a uniaxial magnetic film is initially in a single domain state and only the hard axis field is applied along a selected region of the film, e.g., along a strip conductor. Since the hard axis field is applied locally, i.e., along an overlapping portion of the film, it is defined as being inhomogeneously applied, in a manner commonly known in the art. Magnetostatic interaction between successive adjacent portions in the film extending away from the selected region, will produce partial rotation in the neighborhood of the selected region and along the successive adjacent portions. That is, magneto-static energy is reduced at the expense of anisotropy energy while the exchange energy is vanishingly small.

In the preferred embodiments a homogeneous easy axis field is applied by means of a propagating line placed in close proximity to a thin magnetic film, wherein the field is anti-parallel to the magnetization of the film. In addition the inhomogeneous hard axis field is applied by means of a strip conductor which extends generally perpendicular to the propogating line in close proximity to the film.

Regarding the preferred embodiment of the invention and assuming that the actual distribution of the magnetization is known, application of a small field anti-parallel to the original magnetization in addition to the hard axis field of previous invention, will tend to enlarge the extent of the partially rotated region. This follows from the fact that the torque $$\vec{T}=\vec{H}_e\times\vec{M}_x$$

is largest in the region where significant partial rotation has already occurred. Consequently the effective field experienced by the region where the magnetization was initially rotated by a small angle, increases in such a way as to enhance further rotation. Thus in the preferred embodiment the entire region of partial rotation is pushed away from the strip conductor, and in both embodiments there exists a magnetic wavefront which travels rapidly away from the selected region defined by the strip conductor. The center of this wavefront travels at a speed of typically $10^7$ centimeters per second and the speed of the leading edge of the wavefront is generally an order of magnitude faster. Such a speed is at least two orders of magnitude greater than the velocity of a regular domain wall to which less than one oersted of excess field has been applied.

Readout may be accomplished in the inventive system by placing a sense loop adjacent the thin film near the edge of the propagating line in the region of a read strip conductor. A current applied to the read conductor annihilates all the flux through the sense loop whereupon the absence or presence of an output signal would be indicative of the state of magnetization of the thin film region previous to the current in the read conductor.

Although the invention is primarily described hereinafter utilizing an easy axis field $H_e$ anti-parallel to the original state of thin film magnetization in conjunction with the local application of a hard axis field $H_h$, it is to be understood that the invention concepts also include the theory and associated logic elements wherein only the hard axis field $H_h$ is provided. That is, although the reversal effect is not as prominent nor as efficient as when also using an easy axis field $H_e$, a reversal is nonetheless propagated within an area of the thin film extending from a conductor as is shown for example by the chart of FIG. 1*a* further described below. In such system it is only necessary to locate the readout point nearer to the write conductor and to utilize a readout system such as a magnetooptic readout system.

Regarding briefly now the underlying theory of the invention, suppose a field, having some critical value, is applied to a magnetic thin film. Coherent switching is then induced at some locations whereas the remainder of the film remains unswitched. Magnetostatic interaction between the switched and the unswitched portions adds to the effect of the applied field. Therefore, the switched regions start expanding. This expansion should not be confused with conventional domain wall motion. The switching, in this case, is induced by a rotational, non-coherent mode and rotational switching will continue to govern the reversal of magnetization. Thus, instead of a narrow domain wall (e.g., 1000 A.) such as in conventional domain wall motion, there is a much wider region where switching takes place. The rotational speed, in turn, will increase essentially in proportion to the width of this pseudo-domain wall.

The present invention provides a device not heretofore available, which for example provides both magnetic logic and storage functions, is not affected by irradiation, which provides a relatively high speed logic and storage device, which is small in size, and which requires relatively few elements to form a selected gate. Since the thin film magnetic devices of the invention lend themselves to a planar logic system, the logic elements and the overall logic circuits which can be made therefrom will not only be fast, in operation, but will be economically feasible to fabricate as well. In addition, magnetic thin film devices have a permanent memory, unlike semi-conductor devices which are volatile in nature, and thus provide a preferred storage and logic system.

DESCRIPTION OF THE PREFERRED EMBODIMENTS

Figure 1:
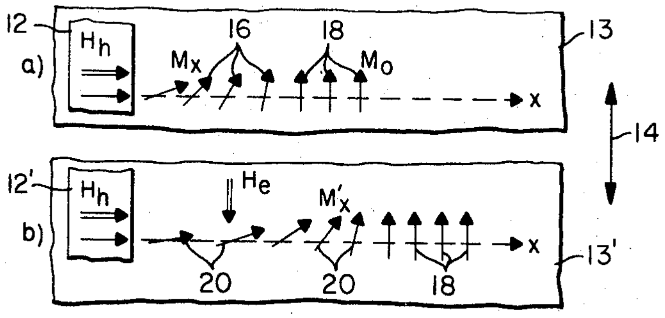
FIG. 1*a–b* is a simplified view of apparatus of two embodiments of the invention by way of example only, including graphs which compare the effects of magnetostatic interaction along respective lengths of magnetic thin films, showing in FIG. 1*b* how the partially rotated region is enlarged by the addition of an anti-parallel easy axis field.

Referring now to FIG. 1*a–b*, a comparison is made between the magnetization curling experienced in a magnetic thin film with and without the application of a small easy axis field anti-parallel to the initial magnetization of the thin film in accordance with the two specific embodiments of the invention, which are described herein. Thus, in FIGS. 1*a* and 1*b* there is shown respectively a partial strip conductor 12, 12′ which is disposed in close magnetically-coupled proximity to magnetic thin films 13, 13′ in which the actual magnetization rotation occurs. The direction of the easy axis is shown by arrows 14. Considering first the case of a uni-axial magnetic film which is initially in a single domain state, if only a hard axis field $H_h$ is applied as by introducing a current to the conductor strip 12 of FIG. 1*a*, magneto-static interaction between adjacent regions in the film will produce partial rotation in the neighborhood of the strip conductor 12 edges. In other words, magneto-static energy is reduced at the expense of anisotropy energy while the exchange energy is vanishingly small. The degree of rotation and the extent of the degree is exemplified by the arrows 16 which in the region of the thin film immediately adjacent the strip conductor 12 are rotated almost parallel to the applied field $H_h$, and which at points farther from the strip conductor 12 are progressively less affected by the field $H_h$ to a point where the original magnetization is unaffected at all as shown by the arrows 18. Note that although the extent of the rotation of magnetization is not as great as that described infra with regard to FIG. 1*b*, the effect is enough that a readout or sense device could be disposed in spaced-apart relation to the conductor 12 to allow detecting the rotation. Although the effect is shown herein propagating only to the right, in actuality the effect propagates both ways. However, as shown hereinafter unidirectional propagation is preferred.

Referring to FIG. 1*a*, if the actual distribution of $M_x$ is known, and if a small field $H_e$ is applied anti-parallel to the original magnetization of the magentic thin film 13, the partially rotated region shown by arrows 16 of FIG. 1*a* will be enlarged as depicted by the arrows 20 of FIG. 1*b*. This follows from the fact that the torque $$\vec{T}=\vec{H}_e\times\vec{M}_x$$

is largest in the region where significant partial rotation has previously occurred. Consequently, the effective field experienced by the region where the magnetization was initially rotated a small angle increases in such a way as to enhance further rotation of the magnetization. Thus the entire region of partial rotation is pushed or expanded from the strip conductors 12, 12′ as illustrated in the comparison between the FIGS. 1*a* and 1*b*. FIG. 1*b* is valid under the assumption that the formation of domain walls by any combination of $H_e$ and $H_h$ be excluded. In this case, $H_e$ is further increased until at a critical threshold of propagation $H_{crit}$ the region near the strip conductor 12 will flip over. As it has been postulated that no domain walls ever form, the partially reversed region has no choice but to travel to infinity.

Figure 2:
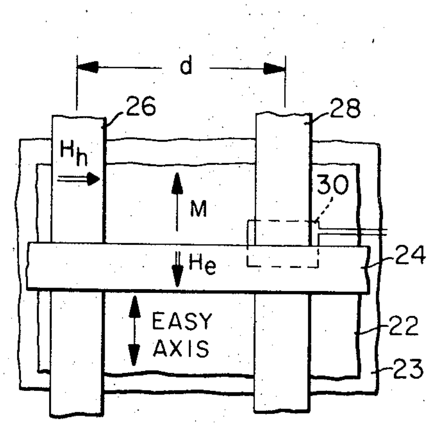
FIG. 2 is a fragmentary view of apparatus utilized to test the operation and feasibility of the invention concepts.

Referring to FIG. 2 there is shown a simplified version of apparatus utilized to test, as well as to show the broad concepts of, the invention. A magnetic thin film 22, made for example of a material such as permalloy is disposed on a suitable substrate 23 formed of for example glass, and is provided with a propogating line 14 placed in close, magnetically coupled, proximity to the film 22. When supplied with a current pulse, the propagating line 24 generates a field $H_e$ opposite in polarity to the magnetization M of the permalloy film 22. The magnitude of $H_e$ should be less than the threshold of domain wall motion and/or nucleation and greater than the critical threshold of propagation $H_{crit}$. A write and a read strip conductor 26 and 28 respectively, are spaced apart a selected distance *d*, in generally perpendicular relation to the propagating line 24 and adjacent the thin film 22. That is, the propagating line 24 should be disposed approximately perpendicular to the easy axis, and the conductors 26, 28 should be disposed approximately parallel to the easy axis to obtain the best performance. When a "write pulse" is applied to the write strip conductor 26, an inhomogeneous hard axis field $H_h$ is produced. The write pulse should be strong enough to insure uniform rotation within the film 22 at least in the area of the center of the conductor 26 where it overlaps the propagating line 24. The rotated portion of the magnetic film 22, however, tends to expand laterally from the write conductor 26 and along the propagating line 24 due to the magnetostatic interaction phenomenon. This expansion is significantly enhanced or enlarged by the propagating field $H_e$. Note that the initial rotation due to $H_h$ is governed by a much shorter time constant than the expansion due to $H_e$. Initially, magnetization M and propagating field $H_e$ were exactly opposite. Therefore the net torque $$\vec{T}=\vec{H}_e\times\vec{M}$$

was equal to zero. If the magnetization is rotated due to the local application of $H_h$ (FIG. 1*a*), the effective torque increases rapidly and the particular portion of magnetic film will continue to experience the associated rotational phenomenon by itself. As this reversal is taking place along the propagating line 24, the same magnetiostatic effect will induce rotation in the successive adjacent regions of the film 22 therealong. Thus a wavefront is created which starts at the write location in the region of the strip conductor 26 and expands at very high speed therefrom. Velocities of $10^7$ centimeters per second have been measured and shown to be reproducible.

At a given location along the propagating line 24, readout is desired. This may be accomplished indirectly by a read strip conductor 28 in combination with a sense loop 30 where the sense loop is preferably placed immediately adjacent the thin film 22 to provide optimum magnetic coupling therewith. Homogeneous magnetization of the magnetic thin film 22 produces no sense signal in the loop 30. The region where the easy axis field $H_e$ is applied is restricted to the line 24 width in the particular embodiment of FIG. 2. Partial rotation of the magnetization within the line width creates fringing flux lines near the edge thereof which are detected by the sense loop 30 which is disposed against the film in the region of the overlapping conductor 28 and line 24. More particularly, the sense loop 30 is symmetrically placed with respect to the read strip conductor 28, and the lower loop thereof is disposed near the center of the propagating line 24. Sensing is more efficient if a readout pulse greater than the anisotropy field $H_k$ is applied to the conductor 28 that pulls all magnetic moments of the local region near the sense loop into the hard axis. An appreciable signal will result only if a magnetic rotation is present beneath the sense loop 30.

Figures 9, 10:
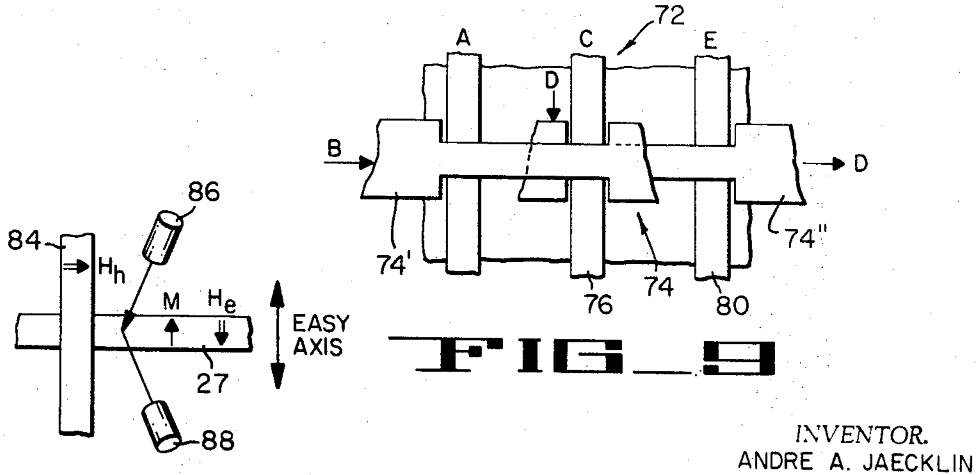
FIG. 10 is a simplified diagram showing readout by means of a magnetooptic system in accordance with the invention.

As briefly described with reference to FIG.1*a*, the device of FIG. 2 could also operate by employing only the write strip conductor 26 adjacent the thin film 22, and by applying thereto a current pulse which creates the hard axis field $H_h$. The reversal effect is produced within the thin film 22 all along the conductor 26, and the rotated portion extends therefrom across the film 22. Since the propagating line 24 is not employed the sense loop 30 will not be able to detect the rotation of the magnetization at a readout point removed from the write conductor 26. Accordingly as depicted in FIG. 10, readout is provided by utilizing a magnetooptic readout system employing for example the Kerr magnetooptic effect, which would be capable of detecting the degree of rotation of the magnetization in the thin film 22 in the conventional and well-known manner. It should be understood that if desired, the magnetooptic readout system could be employed with any of the invention embodiments and/or basic logic elements in place of the sense loop 30.

Figure 3:
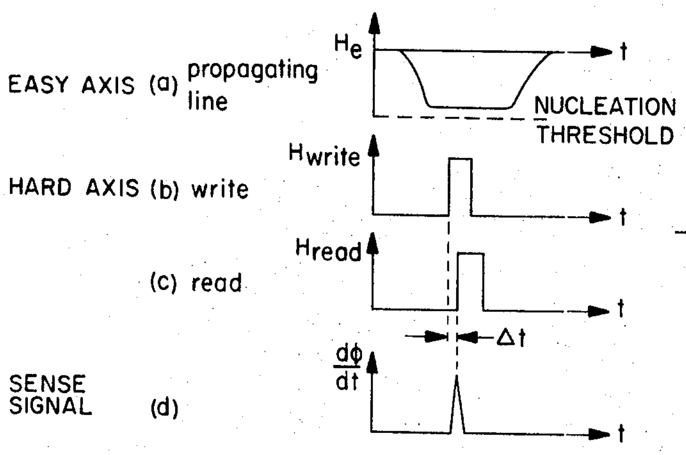
FIG. 3*a–d* is a series of wave forms depicting by way of example only a pulse program utilized with the apparatus of FIG. 2.

In operation, referring to the pulse program shown in FIG. 3 as well as to the apparatus of FIG. 2, the film is initially reset to the state M. The propagating line 24 is then excited with a relatively slow rise time current pulse, for example 100 nanoseconds, thus creating a field $H_e$ which opposes the magnetization M of the thin film 22 in the region thereof along the superimposed propagating line 24 (FIG. 3*a*). The net field in this region is adjusted to the desired value of $H_e$ below the threshold where domain walls either form or propagate. Because $H_e$ is anti-parallel to the initial magnetization M, no torque results and nothing will happen. Next the write strip conductor 26 is excited with a fast rise time pulse of the order of, for example, 5 nanoseconds, producing a hard axis field $H_h$ which is large compared to the anisotropy field $H_k$ (FIG. 3*b*). Application of the fast rise time write pulse causes the spins in the region of the film 22 below the overlapping regions of the line and the conductor 26 to rotate almost coherently into the hard axis (short time constant). The timing is such that the hard axis pulse occurs when the maximum reverse field $H_e$ is appled to the region of the propagating line 24. This write pulse thus creates a partially reversed region $M_x$, $M_x'$ as in FIGS. 1*a*, and 1*b*, respectively, which is then expected to expand along the propagating line 24 in FIG. 1*b*.

Next a fast rise time, hard axis field is applied (FIG. 3*c*) e.g., by means of a current pulse to the read strip conductor 28 in the region of the sense loop, which pulse is delayed by a period $\Delta T$ with respect to the write pulse introduced to the write strip conductor 26. The fast rise time current pulse applied to the read strip conductor 28 instantaneously annihilates all the flux through the sense loop 30. The integral of the sense pulse corresponds to the flux switched by the fast reversal, whereupon a signal will result at the output of the sense loop 30 (FIG. 3*d*) if a magnetically reversed region is present adjacent thereto in the thin film 22, but the signal will be equal to zero if the reversed region is not present. Accordingly, binary digit information in the form of "0's" and "1's" can be sensed by readout. Thus the sense loop 30 provides an output equal to $$V_s=\frac{d\phi}{dt}$$

which would be the change of flux sensed by sense loop 30 upon application of the read ulse to the strip conductor 28.

In the apparatus of FIG. 2, as well as the logic elements described supra, the thin film is "reset" after each operation to prepare it for the next cycle. That is, the film 22 is returned to its initial state by application of a bulk field or of a large $H_e$ field via the propagating line 24.

Figure 4:
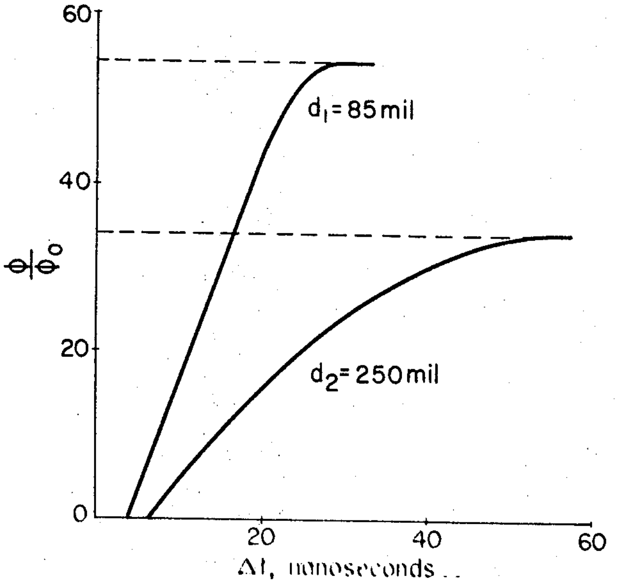
FIG. 4 is a graph comparing the flux $\phi$ for a given time interval $\Delta T$, with the total flux change obtained if the magnetic film had been switched in the conventional way.

Referring to FIG. 4, the flux $\phi$, during a given $\Delta T$, is compared to the total flux change obtained if the magnetic film had been switched in the conventional way, such as for example, by domain wall motion devices. Data has been taken for two apparatus examples having readout locations, i.e., read conductors 28, which are spaced 85 mil and 250 mil distances from the write strip conductor 26 respectively. A continuous flux change appears to occur during approximately 20 nanoseconds and 40 nanoseconds respectively without ever being complete.

Note that the value of the hard axis field $H_h$ is not very critical, except that it is preferable that the field be larger than approximately two times $H_k$. By contrast, the easy axis field $H_e$ has a very well-defined threshold below which nothing happens. An upper limit for $H_e$ is given by the nucleation threshold as previously mentioned.

The device shown in FIG. 2, as well as the basic logic elements further described hereinafter, are fabricated by any of the conventional thin film fabricating techniques. More particularly, the conductors and the propagating line may be vacuum deposited directly on a sheet of thin film, in selected order, utilizing in addition suitable masks and etching techniques well known in the art of vacuum deposition. The thin film is generally supported by a suitable substrate, e.g., glass. In addition, the conductors and the line may be vacuum deposited or electroplated on a separate substrate, which is then placed against the thin film. As noted the conductors may be placed under the propagating line and closest to the thin film, or the line may be placed under the conductors. In any event, the propagating line and the conductors are electrically insulated from one another as well as from the thin film. Likewise propagating lines of successive logic devices, cascaded to form an overall logic system as further described hereinafter, are also electrically insulated from each other.

Although only two specific invention embodiments have been discussed to simplify the description of the invention concepts, various modifications and alternative embodiments are within the scope thereof. For example, although the apparatus has been described utilizing a sheet of magnetic thin film, write and read conductors disposed in close proximity to the film, and a propagating line disposed over the conductors in close proximity to the film, the propagating line 24 of FIG. 2 may be dispensed with and a "bulk" field $H_e$ is applied to the entire sheet of thin film 22. Thus instead of the field $H_e$ (and the magnetization rotation effect) existing only along a selected region (or regions) corresonding to the propagating line 24, the field and the effect would be produced throughout the film 22 extending frm the region of the write conductor 26. Readout is effected by the magnetooptic readout system of FIG. 10.

Another structural modification would be to provide strips 27 of thin film deposited on a substrate (not shown) as is depicted in FIG. 10, rather than a continuous sheet of film as heretofore described. The strips 27 are formed to correspond to the propagating line of previous description, which itself could be used or dispensed with as desired. Thus if a bulk field $H_e$ were to be applied to the thin film strip configuration, the effects thereof and the resulting magnetization rotation upon application of the write pulse, would be restricted to a band-like region such as when utilizing the propagating line on a thin film sheet.

Various other techniques suggest themselves as possible ways of defining the apparatus construction. For example, "hard" magnetic thin films may be deposited upon "soft" thin films to provide the desired definition of magnetic reversal regions.

Figure 5:
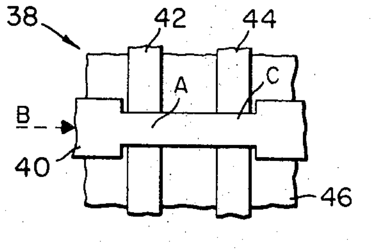
FIGS. 5–9 are simplified views of some of the basic logic elements which can be fabricated utilizing the concepts of the invention.

The above effect and apparatus of the invention readily lends itself to individual logic elements as well as to an overall system of fast magnetic logic. If the entire plane of magnetic thin film is magnetized in one direction initially, this state could define, for example, a binary digit "0." Reversal of the film beneath the propagating line 24 of FIG. 2 at one location would then represent a binary digit "1." FIGS. 5–9 show several basic logic elements employing the concepts of the invention, which elements may be utilized in various combinations to provide overall logic systems. For example, FIG. 5 shows a magnetic thin film device 38 capable of performing either the logic NOT or a special AND function. The device is similar to the apparatus of FIG. 2 in that it has a single propagating line 40 disposed generally perpendicular to a pair of spaced-apart write and read strip conductors 42 and 44 respectively, the combination being placed in close proximity to a magnetic thin film 46. Suppose there is no information written at location A of the film 46. A write pulse is introduced to the write strip conductor 42 to initiate a fast reversal along propagating line 40, and thus a "1" is written at point C in the film 46. If the magnetization was already reversed at point A, it would be impossible to create such a fast propagating reversal with a write pulse, so that no information would be transferred to point C. Thus the device 38 performs the logic NOT function as shown in the following Table I:

| A | C |
|---|---|
| 0 | 1 |
| 1 | 0 |

where $B=1$ then $\overline{A}=C$, where $\overline{A}$ means "not A."

Referring again to the device of FIG. 5, assume the logic inputs are the magnetization at the write location A previous to any write pulse (true if anti-parallel to M). Another logical input B (shown in phantom line) may be given by the presence or absence of a pluse on the propagating line 40 (true if pulse is present). For the configuration of FIG. 5, an output C will be given by the state of magnetization at the read location as follows: $\overline{A}\cdot B=C$. This function represents a special type AND gate. The symbols are those commonly used in Boolean algebra.

Note that in FIG. 5 as well as in the remaining figures, the devices utilize propagating lines which are graduated abruptly into a larger width immediately outside the edges of the write and read conductors. The use of a "graduated" or "constricted" propagating line limits the region along the film where magnetic reversal takes place, since outside the constricted portion of propagating line 40, the field $H_e'$ which is produced is too small to effect a reversal. Furthermore, use of a graduated line 40 provides accurate control over the direction as well as the distance of a magnetic reversal.

Figure 6:
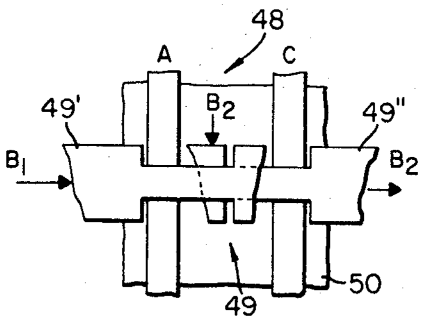

The concept of an AND gate may be further expanded as is shown in FIG. 6, which shows a logic device 48 utilizing a double or overlapped propagating line 49 formed of lines 49' and 49''. The lines 49' and 49'' are overlapped in electrically insulated relation but still in magnetic bridging relation to the thin film 50. Thus in order to propagate a magnetic reversal, both propagating lines 49' and 49'', i.e., $B_1$ and $B_2$, are excited simultaneously. An output C will be given by the state of magnetization at the read location as follows: $\overline{A}(B_1\cdot B_2)=C$.

Figure 7:
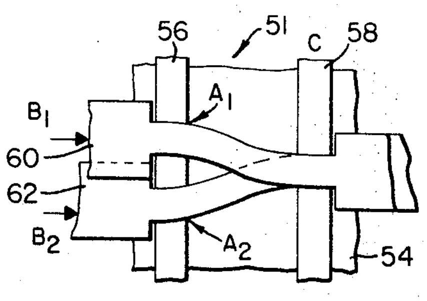
Figure 8:
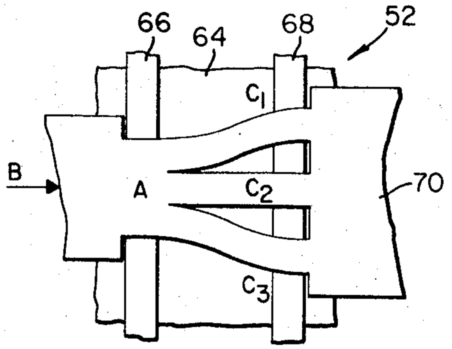

Referring next to FIGS. 7 and 8, the concepts are extended to devices 51 and 52 which are capable of performing OR and fan-out logic functions respectively. In FIG. 7, the OR device 51 comprises a thin film 54, a write and a read strip conductor 56 and 58 respectively, and a pair of propagating lines 60, 62 which are superimposed in the region of the read strip conductor 58, but spread apart to define individual and isolated lines in the region of the write strip conductor 56. Actually two NOT gates of FIG. 5 are coupled together to form the OR gate of FIG. 7. Thus two inputs $A_1$ and $A_2$ and a single output C are provided in the OR device, and the device 51 performs the logic OR functions shown herein in the following Table II:

| $A_1$ | $A_2$ | C |
|---|---|---|
| 0 | 0 | 1 |
| 0 | 1 | 1 |
| 1 | 0 | 1 |
| 1 | 1 | 0 |

An output C will be given by the state of magnetization at the read location as follows: $\overline{A}_1+\overline{A}_2=C$. It follows that the device 51 may also be used as an inverting AND gate with the logic relationship $A_1\cdot A_2=\overline{C}$. Note also that a more sophisticated logic function may be represented if the pulses $B_1$ and $B_2$ are conditional as well.

In FIG. 8, the fan-out device 52 comprises a thin film 64, write and read strip conductors 66 and 68 respectively, and a propagating line 70 which defines three lines in the region extending along the read strip conductor 68, which are equally split from the single, integral line in the region of the write strip conductor 66. Thus the fan-out device 52 has a single input B and a plurality of outputs (e.g., three outputs $C_1$, $C_2$ and $C_3$ in this particular example), wherein a single input via the line 70 and the write conductor 66 may be presented to, and/or readout by, a plurality of succeeding circuits and/or readout devices respectively. The logic relationship of the fan-out can be expressed as $\overline{A}\cdot B=C_1=C_2=C_3$.

FIG. 9 exemplifies the concept of cascading two of the invention logic devices together to perform a further logic function. Thus, instead of coupling two NOT gates together to form an OR gate as in FIG. 7, two AND gates can be cascaded in series to provide a cascaded AND gate 72 as in FIG. 9. As in FIG. 6, a propagating line 74 is formed of overlapping insulated propagating lines 74' and 74'', wherein however, the overlapping is in the region of, and encompasses, a center conductor 76. In this device a write conductor 78 performs the initial write function, and a read conductor 80 performs the readout function. However, the center conductor 76 can perform a read function or a simultaneous read-and-write function utilizing the same fast rise time pulse. Thus it is possible to have applications wherein the read conductor of logic devices may also perform the write function. In the device 72 the reversal is serially propagated or not propagated depending on the logic being performed. The logic relationship may be shown by $$\left.\begin{array}{l}\overline{A}\cdot B=C\\ \overline{C}\cdot D=E\end{array}\right\}\overline{\overline{A}\cdot B}\cdot E=E$$

Thus, with the basic logic elements shown hereinbefore, any desired logic function or system, or combination of logic functions can be provided by coupling or cascading the required devices together. Since the manner of making such combinations would be known to those skilled in the art, no further description thereof is believed necessary herein.

Note that in fabricating the elements, the total width of the propagating line remains constant after splitting as shown in FIGS. 7 and 8. The input B and the outputs $C_1$, $C_2$, $C_3$ of the fan-out logic element of FIG. 8 are similar to those provided by the logic element shown in FIG. 5 wherein however there are three outputs rather than only one. It is to be understood that the fan-out logic element could have any reasonable plurality of output propagating lines rather than the three shown herein by way of example only, in FIG. 8.

FIG. 10 referred to above, shows a device 82 which depicts the concept of utilizing a thin film strip 27 rather than a sheet, a write strip conductor 84 for applying a field $H_h$, and a conventional magnetooptic readout system which employs a light source-polarizer means 86 and a light detection-analyzer means 88 to detect the magnetic rotation effected by the invention.

Although the present invention is described herein with reference to various embodiments, additional variations and modifications may be made thereto within the scope of the invention; therefore it is not intended to limit the invention except as defined in the following claims.

I claim:

1. A method for switching a magnetic thin film which is initially in a single domain state along its easy axis comprising the steps of:

locally applying an inhomogeneous hard axis write field to a portion of the film to locally rotate the domain state;

homogeneously applying an easy axis field along a selected region of the thin film for a selected time interval, said easy axis field being anti-parallel to the initial magnetization;

propagating the magnetic rotation along the selected region of the thin film to define a specific channel of magnetic rotation which propagates the length of the selected region during a predetermined time period encompassed by the selected time interval; and detecting during the time period the magnetic reversal being propagated along the length of the selected region at a selected point spaced from the point of write field application.

2. A method for switching a magnetic thin film which is initially in a single domain state along its easy axis comprising the steps of;

locally applying an inhomogeneous hard axis write field to a portion of the film to locally rotate the domain state;

homogeneously applying an easy axis field along a selected region of the thin film for a selected time interval, said easy axis field being anti-parallel to the initial magnetization;

propagating the magnetic rotation along the selected region of the thin film to define a specific channel of magnetic rotation which propagates during a predetermined time period encompassed by the selected time interval; and detecting during the time period the magnetic reversal being propagated along the selected region at a selected point therealong;

wherein the step of detecting further comprises, applying a hard axis read field to the film at said selected point along the selected region of magnetic reversal propagation immediately after applying said hard axis write field and during the time interval of the easy axis field, and sensing with respect to time the change of flux of the thin film at said selected point.

3. The method of claim 2 wherein the step of homogeneously applying an easy axis field further comprises, applying a current pulse of relatively slow rise time and of said time interval to said selected region of the thin film, and wherein the step of locally applying an inhomogeneous hard axis write field comprises applying a current pulse of relatively fast rise time to the think field during the time interval of the easy axis field.

4. System for providing fast logic and storage within a thin magnetic film by means of the propagation of a magnetic reversal by a rotational mode, the film having an easy axis of magnetization, comprising;

write conductor means including a write conductor disposed in magnetically coupled proximity to the thin film and substantially parallel to the easy axis thereof to provide an inhomogeneous hard axis field in the portion of the thin film overlapped by the write conductor means;

said magnetic film having at least one selected region defining a channel for the magnetic reversal propagation extending substantially perpendicularly to the write conductor means;

source beams for providing current pulses to said write conductor means to generate the hard axis field and thus the propagation of said magnetic reversal along the length of said selected region;

propagating means including a field propagating line disposed in close proximity to the thin film and overlapping the write conductor in magnetically coupled relation therewith, and substantially perpendicular to the easy axis of the film, said field propagating line providing a homogeneous easy axis field which is anti-parallel to the initial state of magnetization of the thin film and which defines said selected region of the thin magnetic film; and detecting means operatively disposed relative to said selected region to sense the magnetic reversal at a selected point spaced from the write conductor and defining the length of said region during the propagation of the magnetic reversal.

5. The system of claim 4 wherein said signal detecting means comprises a magnetooptic readout system including a generated light beam directed against said thin film at said selected point spaced from said write conductor and adapted to sense the presence and the absence of a magnetic reversal by means of the magnetooptic rotational effect.

6. The system of claim 4 wherein said signal detecting means further includes a read conductor disposed in magnetically coupled proximity to the thin film and at said selected point along the region of propagated magnetic reversal to be thus spaced a selected distance from and substantially parallel to the write conductor, and magnetic field sense means magnetically coupled to the thin film and to the read conductor at said selected point.

7. The system of claim 4, wherein the thin magnetic film includes a pluraltiy of parallel strips each defining the respective channel and thus the selected region for propagation of said magnetic reversal, said write conductor means being disposed substantially perpendicularly across the strips to apply the inhomogeneous hard axis field to each strip.

8. System for providing fast logic and storage within a thin magnetic film by means of the propagation of a magnetic reversal by a rotational mode, the film having an easy axis of magnetization, comprising;

write conductor means including a write conductor disposed in magnetically coupled proximity to the thin film and substantially parallel to the easy axis thereof to provide an inhomogeneous hard axis field in the portion of the thin film overlapped by the write conductor means;

said magnetic film having at least one selected region extending substantially perpendicularly to the write conductor means;

source means for providing current pulses to said write conductor means to generate the hard axis field and thus the propagation of said magnetic reversal along said selected region;

propagating means including a field propagating line disposed in close proximity to the thin film and overlapping the write conductor in magnetically coupled relation therewith, and substantially perpendicular to the easy axis of the film, said field propagating line providing a homogeneous easy axis field which is anti-parallel to the initial state of magnetization of the thin film and which defines said selected region of the thin magnetic film; and detecting means operatively disposed relative to said selected region to sense the magnetic reversal at a selected point along said region during the propagation of the magnetic reversal;

said detecting means further including a read conductor disposed in magnetically coupled proximity to the thin film and at said selected point along the region of propagated reversal to be thus spaced a selected distance from and substantially parallel to the write conductor, and magnetic field sense means magnetically coupled to the thin film and to the read conductor at said selected point, the magnetic field sense means including a sense loop generally disposed in the overlapping region of said propagating line and said read conductor in magnetically coupled relation to the thin film and adapted to sense the change of flux within the thin film upon application of a read pulse to said read conductor.

9. System for providing fast logic and storage within a thin magnetic film by means of the propagation of a magnetic reversal by a rotational mode, the film having an easy axis of magnetization, comprising;

write conductor means including a write conductor disposed in magnetically coupled proximity to the thin film and substantially parallel to the easy axis thereof to provide an inhomogeneous hard axis field in the portion of the thin film overlapped by the write conductor means;

said magnetic film having at least one selected region extending substantially perpendicularly to the write conductor means;

source means for providing current pulses to said write conductor means to generate the hard axis field and thus the propagation of said magnetic reversal along said selected region;

propagating means including a field propagating line disposed in close proximity to the thin film and overlapping the write conductor in magnetically coupled relation therewith, and substantially perpendicular to the easy axis of the film, said field propagating line providing a homogeneous easy axis field which is anti-parallel to the initial state of magnetization of the thin film and which defines said selected region of the thin magnetic film; and detecting means operatively disposed relative to said selected region to sense the magnetic reversal at a selected point along said region during the propagation of the magnetic reversal;

said detecting means further including a read conductor disposed in magnetically coupled proximity to the thin film and at said selected point along the region of propagated reversal to be thus spaced a selected distance from and substantially parallel to the write conductor, and magnetic field sense means magnetically coupled to the thin film and to the read conductor at said selected point;

said propagating line having a constricted portion which extends slightly beyond the opposite lateral edges of the write and read conductors, and said line and conductors are electrically insulated from each other and from the film.

10. The system of claim 9 further including, substrate means adapted to support the magnetic thin film, a first propagating line disposed in magnetically coupled relation to the write conductor and to the thin film, a second propagating line disposed in magnetically coupled relation to the read conductor and to the thin film, wherein the first and second lines overlap each other in the region between the write and read conductors in electrically insulated relation.

11. The system of claim 9 further including, substrate means adapted to support the magnetic thin film, a first and a second propagating line disposed in magnetically coupled relation to each other and to the thin film, wherein the lines are superimposed in the region of the read conductor to define a single line width and spaced apart in the region of the write conductor to define individual lines.

12. The system of claim 9 further including substrate means adapted to support the magnetic thin film, a propagating line disposed in magnetically coupled relation to the write and read conductors and the thin film, said line defining a relatively wide line in the region of the write conductor and is split to define a plurality of lines in the region of the read conductor.

References Cited

UNITED STATES PATENTS

| | | | |
|---|---|---|---|
| 3,139,608 | 6/1964 | Doughty | 340—174 |
| 3,165,722 | 1/1965 | Ghisler | 340—174 |
| 3,248,713 | 4/1966 | Middelhoek | 340—174 |

OTHER REFERENCES

Leaver and Prutton, JAP, Supplement to vol. 33, No. 3, March 1962, "Inhomogeneous Coherent Magnetization Rotation in Thin Magnetic Films."

Edwards, Nature, vol. 203, Aug. 15, 1964, "Apparent Anisotropy Field of Continuous Magnetic Films Subjected to Inhomogeneous Drive Fields."

JAMES W. MOFFITT, Primary Examiner